March 3, 1931.        H. MARLES        1,794,634
ROLLER BEARING CAGE AND METHOD OF FORMING THE SAME
Filed Jan. 14, 1929
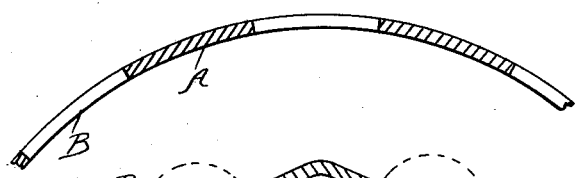
Fig. 1.
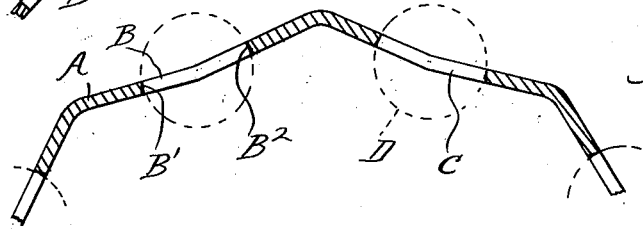
Fig. 2.
Fig. 3.   Fig. 4.   Fig. 5.
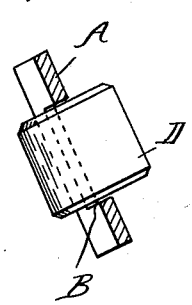 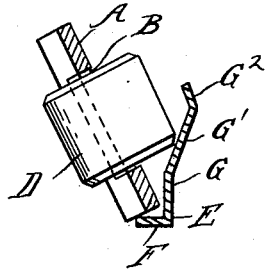 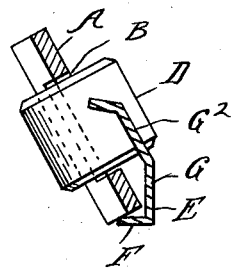
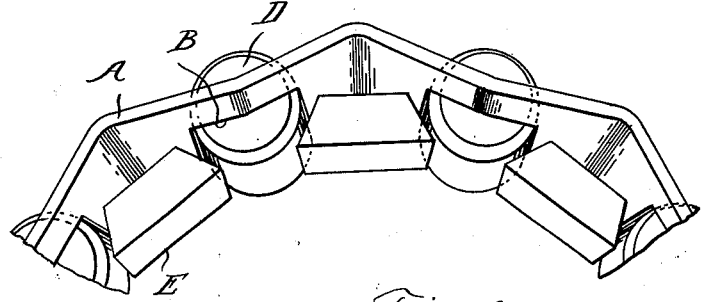
Fig. 7.   Fig. 6.
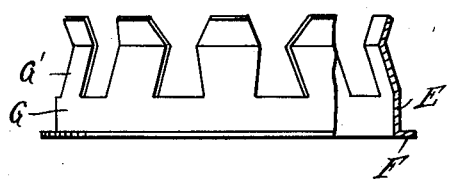
INVENTOR
Henry Marles
BY
ATTORNEYS Patented Mar. 3, 1931

1,794,634

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

ROLLER-BEARING CAGE AND METHOD OF FORMING THE SAME

Application filed January 14, 1929. Serial No. 332,515.

The invention relates to roller cages or retainers and consists in the novel construction and method of forming the same as hereinafter set forth.

In the drawings:

Figure 1 is a horizontal section through an element of a roller bearing cage showing the first step in the formation of the same;

Figure 2 is an enlarged view of a portion of the element shown in Figure 1 illustrating a second step in the process;

Figure 3 is a cross section showing a roll placed in engagement with the cage;

Figure 4 is a similar view with the retainer member in initial engagement with the cage, and Figure 5 is a similar view with the retainer bent into retaining position.

Figure 6 is a plan view of a portion of the completed cage and roll retainer.

Figure 7 is a sectional side elevation of one of the elements of the cage.

It is the primary object of the invention to obtain a construction of cage which has a considerable amount of rigidity and strength and at the same time is one which may be readily manufactured. With this object in view I have dispensed with the formation of bent flanges or tongues to act as roll retainers, and this enables me to form the cage of much heavier and more rigid stock. The retaining sockets are formed by first cutting apertures through the cage and then crimping the metal so as to arrange the original parallel side walls of the apertures in angular relation to each other, and in tangent relation to the rolls. Thus a simple annulus so apertured and crimped will form an effective cage for holding the rolls in spaced relation and limiting their radial outward movement. In order, however, to completely retain the rolls in engagement with the cage, they must be held from radial inward movement which is accomplished by an auxiliary annular tongued member as will be hereinafter set forth.

In detail, A is an annular cage member formed of relatively heavy sheet metal, and as specifically shown, of conical form. This member has formed therein, preferably by stamping, a series of apertures B which, as originally formed, have parallel side walls. The apertured portions of the annulus are then crimped as indicated at C which arranges the sides B' B² thereof at an angle to each other and spaced apart by a distance less than the diameter of the roll. The rolls D may then be engaged with the recess from the inner side and the angling edges will be arranged in tangent relation and will prevent outward displacement.

To retain the rolls in the cage I form a second annular member E of lighter gauge metal having a portion for fitting within the lower end of the member A and provided with an outwardly extending flange F. The member E is further provided with upwardly extending tongues G which are so fashioned that when bent to the proper angle they will extend between adjacent rolls and will hold the same from inward displacement. The tongues G are initially formed with inwardly bent portions G' and an outwardly bent portion G², both arranged to clear the rolls when the member is inserted in the lower end of the cage member A. The member E is then die pressed to bend the portions G' outwardly into proximity with the rolls and the portions G² so as to extend between the rolls and into contact with the member A. The proportions are such that at the completion of this operation the portions G' will be in close proximity to but out of direct rubbing contact with the cylindrical surfaces of the rolls when the latter are in engagement with the edges B' and B² of the apertures in the member A. This will leave the rolls free for contact with the inner and outer race members of the bearing but will retain them in fixed relation to each other.

What I claim as my invention is:

1. The method of forming a retainer for roller bearings which consists in forming an annulus with an aperture therethrough for receiving a cylindrical roll, the side edges of said aperture being initially parallel to each other and in then crimping the annulus to place said side edges in angular relation to each other in a plane transverse to the axis of the roll and spaced apart less than the diameter of the roll, whereby they are in tangent relation to the surface of the roll and hold the same from passing through said aperture.

2. The method of forming a retainer for roller bearings which consists in first forming an annulus of relatively thick sheet metal, and with spaced apertures therein for receiving the rolls, the side edges of said apertures being initially in parallel relation with each other, and then crimping said annulus to bring the side edges of said apertures in angular relation to each other in a plane transverse to the axis of the roll and spaced apart a distance less than the diameter of the roll whereby the rolls are held from outward movement through said apertures by said side edges which are in tangent relation of the surface of the roll.

3. The method of forming retainers for roller bearings comprising the forming of a conical annulus having a series of apertures therethrough for receiving the rolls, the side edges of each aperture being initially parallel to each other and to the axis of the roll, in crimping said annulus to bring said side edges into angular relation to each other in a plane transverse to the axis of the roll and spaced apart less than the diameter of the roll, whereby they will form tangent bearings and will prevent outward displacement.

4. The method of forming and assembling roller bearing cages which consists in first forming a conical annular member having a series of apertures therein for receiving the rolls, crimping said member to bring the side edges of said apertures into angular relation to each other in a plane transverse to the axis of the roll and spaced apart less than the diameter of the roll and tangent to the surface thereof, placing rolls in said apertures from the inner side thereof, forming a second annular member insertable in the small end of said conical annular member and having shouldered engagement therewith, said second annular member being formed with tongues which are initially bent to clear said rolls during insertion.

In testimony whereof I affix my signature.

HENRY MARLES.